US007633237B2

(12) United States Patent
Chen et al.

(10) Patent No.: US 7,633,237 B2
(45) Date of Patent: *Dec. 15, 2009

(54) FAST RUN-UP OF METAL HALIDE LAMP BY POWER MODULATION AT ACOUSTIC RESONANCE FREQUENCY

(75) Inventors: Nancy H. Chen, North Andover, MA (US); Joseph A. Olsen, Gloucester, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 174 days.

This patent is subject to a terminal disclaimer.

(21) Appl. No.: 11/860,834

(22) Filed: Sep. 25, 2007

(65) Prior Publication Data

US 2009/0079366 A1 Mar. 26, 2009

(51) Int. Cl.
*H05B 37/02* (2006.01)
(52) U.S. Cl. .................. 315/224; 315/291; 315/246; 315/209 R; 315/DIG. 2
(58) Field of Classification Search .............. 315/224, 315/225, 209 R, 184, 194, 246, DIG. 2, DIG. 4, 315/DIG. 5, DIG. 7, 247, 291, 297, 307–311
See application file for complete search history.

(56) References Cited

U.S. PATENT DOCUMENTS

| 5,017,839 A | * | 5/1991 | Arlt et al. ............ 315/219 |
| 5,684,367 A | | 11/1997 | Moskowitz et al. |
| 6,124,683 A | | 9/2000 | Olsen et al. |
| 6,229,269 B1 | | 5/2001 | Olsen |

OTHER PUBLICATIONS

U.S. Appl. No. 11/860,759, filed Sep. 25, 2007.

* cited by examiner

*Primary Examiner*—Tuyet Vo
(74) *Attorney, Agent, or Firm*—Robert F. Clark

(57) ABSTRACT

A method of controlling run-up of a metal halide lamp that has a nominal (full) light output during steady state operation and that has a current limit $I_{lim}$, includes, during run-up of the metal halide lamp to steady state operation, evaluating requested power $P_{req}$ and requested current $I_{req}$ to operate the lamp at the nominal light output $L_n$ during the run-up, supplying $I_{lim}$ to operate the lamp so long as $I_{req} \geq I_{lim}$ and supplying $P_{req}$ to operate the lamp when $I_{req} < I_{lim}$, and modulating power P supplied to the lamp. The power modulation is preferably at an acoustic resonance frequency of the lamp, such as the first azimuthal resonance mode of the lamp. Power modulation may include sweeping a sine wave ripple on top of an input voltage waveform, wherein a frequency range of the sine wave ripple includes an acoustic resonance frequency.

18 Claims, 1 Drawing Sheet

FAST RUN-UP OF METAL HALIDE LAMP BY POWER MODULATION AT ACOUSTIC RESONANCE FREQUENCY

BACKGROUND OF THE INVENTION

The present invention is related to the invention described in copending application Ser. No. 11/860,759, filed concurrently herewith and titled CONTROL METHOD AND BALLAST FOR RUN-UP OF METAL HALIDE LAMP that is incorporated herein by reference.

The present invention is directed to a method of decreasing the time from ignition to nominal (full) light output of a metal halide lamp.

Metal halide lamps for general lighting are efficient and produce high quality white light. However, the lamps require a few minutes to warm up to nominal light output because ballast output is focused mainly on steady-state operation. Shorter times to nominal light output would improve the applicability of metal halide lamps.

A faster run-up to steady state lamp operation can be achieved by overpowering a cold lamp. A temporarily high power level is not necessarily a problem, but because a cold lamp also tends to have a very low voltage, an excessively high current would be required to achieve the power needed (power=voltage×current). Moreover, care must be taken because excessive power or current can lead to thermal shock, electrode damage, and wall blackening, and lamps typically have a current limit during run-up to avoid these problems. Thus, light output does not reach nominal as quickly as desired.

Power modulation of a metal halide lamp is known. See, for example, U.S. Pat. No. 6,229,269 in which power modulation is used to bend the arc of the lamp to increase the length of the arc and the voltage; U.S. Pat. No. 6,124,683 in which acoustic modulation is used to allow the lamp to be oriented vertically; and U.S. Pat. No. 5,684,367 in which amplitude modulation and pulsing of the input power waveform control color characteristics and arc stability.

SUMMARY OF THE INVENTION

An object of the present invention is to provide a novel method and ballast that shortens the time to nominal light output without damaging the lamp.

A yet further object of the present invention is to provide a novel method of controlling run-up of a metal halide lamp that has a nominal light output during steady state operation and that has a current limit $I_{lim}$, where the method includes, during run-up of the metal halide lamp to steady state operation, evaluating requested power $P_{req}$ and requested current $I_{req}$ to operate the lamp at the nominal light output $L_n$ during the run-up, supplying $I_{lim}$ to operate the lamp so long as $I_{req} \geq I_{lim}$ and supplying $P_{req}$ to operate the lamp when $I_{req} < I_{lim}$, and modulating power P supplied to the lamp. The power modulation is preferably at an acoustic resonance frequency of the lamp, such as the first azimuthal resonance mode of the lamp. Power modulation may include sweeping a sine wave ripple on top of an input voltage waveform, wherein a frequency range of the sine wave ripple includes an acoustic resonance frequency.

Another object of the present invention is to provide a novel ballast that carries out this method.

These and other objects and advantages of the invention will be apparent to those of skill in the art of the present invention after consideration of the following drawings and description of preferred embodiments.

DESCRIPTION OF PREFERRED EMBODIMENTS

Figure 1:
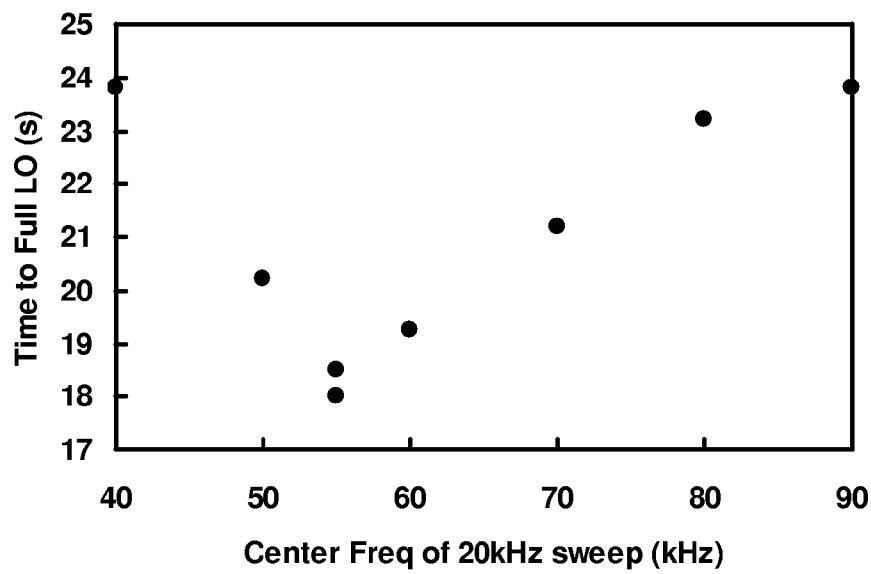
FIG. 1 is a plot of time to full light output (LO) versus center frequency of the swept sine wave ripple.

To achieve the objectives set forth above, the inventors have focused on lamp control immediately following ignition, wherein lamp operation starts with lamp current at the current limit for the lamp. As energy is deposited to the arc and the arc tube heats up, the voltage, power and efficacy gradually increase until the nominal light output is achieved with the current at the current limit. At this point, the lamp is moderately overpowered since it has not warmed to its operating temperature. As the lamp warms, efficacy increases to the steady state level and the power is correspondingly decreased to maintain a (nearly) constant nominal light output. As described in the above-cited copending application, decreasing the power as the lamp warms following the time at the current limit allows the lamp to be at or near nominal light output during the latter part of the run-up to steady state, and thus provides near nominal light output sooner than conventional metal halide lamps, thereby improving the applicability of metal halide lamps.

The present invention further reduces the time to nominal light output by modulating the power during run-up at particular resonant frequencies of the arc tube. The power modulation of the present invention is believed to increase the lamp voltage by increasing the temperature of the coldest part of the lamp tube, wherein increasing the voltage increases the power available to the lamp during the run-up and decreases the time to reach normal operating temperature.

The power modulation of the present invention causes a more favorable temperature distribution in the arc tube of the lamp by causing a more uniform distribution of temperature so that the temperature of the coldest spot in the arc tube increases more quickly. Conventionally, the behavior of a metal halide lamp is dependent on the cold spot temperature and full efficacy is reached when the cold spot reaches its steady state level.

In a preferred embodiment, the method of controlling run-up of a metal halide lamp that has a nominal light output $L_n$ during steady state operation and that has a current limit $I_{lim}$, includes the steps in which, during run-up of the metal halide lamp to steady state operation, requested power $P_{req}$ and requested current $I_{req}$ for operating the lamp at the nominal light output $L_n$ during the run-up are evaluated. During the run-up, the current limit $I_{lim}$ is supplied to the lamp so long as $I_{req}$ is greater than or equal to $I_{lim}$ and $P_{req}$ is supplied to the lamp when $I_{req}$ is less than $I_{lim}$. Further, during run-up, the power P supplied to the lamp is modulated. The power modulation may be at an acoustic resonance frequency of the lamp, such as the first azimuthal resonance mode of the lamp and may include sweeping a sine wave ripple on top of an input voltage waveform, wherein a frequency range of the sine wave ripple is centered on the acoustic resonance frequency.

As best understood, acoustic power modulation improves the run-up of metal halide lamps for several reasons. It has been observed that excitation of some acoustic resonances increases lamp voltage (see, for example U.S. Pat. No. 6,229,269 mentioned above). Mechanisms include increasing salt temperature, bending and lengthening the arc, constricting the arc, etc. Thus, if the run-up current is limited, increasing the voltage delivers more power to the arc of the lamp. In addition, excitation of acoustic resonances influences arc position in the arc tube, which influences heat transfer from the arc to the arc tube wall, possibly increasing the heating of the arc tube wall, which can increase fill evaporation and thus lamp voltage. Experiments show that the salt evaporation pattern changes when acoustic modulation is added. With no modulation, the salt evaporation appears to proceed from the top of the arc tube towards the bottom. The edge of a condensate film appears to move gradually from the top of the arc tube towards the bottom, as might be expected due to convective flows upward along the arc which heats the top part of the arc tube. When modulation is applied, the salt evaporation appears to proceed azimuthally. In general, excitation of acoustic resonances is believed to influence macroscopic gas flow patterns in the arc tube, which increases lamp voltage by modifying arc characteristics and/or distributing heat more favorably for fill evaporation during run-up.

The method may be carried out by a program embodied in a ballast that operates the lamp, such as a conventional electronic ballast.

The inventors conducted experiments to determine the effect of power modulation on run-up time. Acoustic power modulation was applied to an experimental lamp constructed from a 35/39 W ceramic "Powerball®" arc tube. The power modulation was introduced as a swept sine wave ripple on top of the main voltage waveform (in this instance, a 200 Hz square wave main voltage waveform). The swept sine wave frequencies were on the order of tens to hundreds of kHz, with a sweep range width of 20-30 kHz and a sweep rate of 1 kHz. The method of controlling the run-up was the constant current to nominal light output method discussed in the above-cited copending application (also discussed below). The run-up current was limited to 1 A. Note that the average run-up current was "constant" over a time scale of about a millisecond, but of course had high frequency fluctuations due to the imposed swept sine wave ripple.

Figure 2:
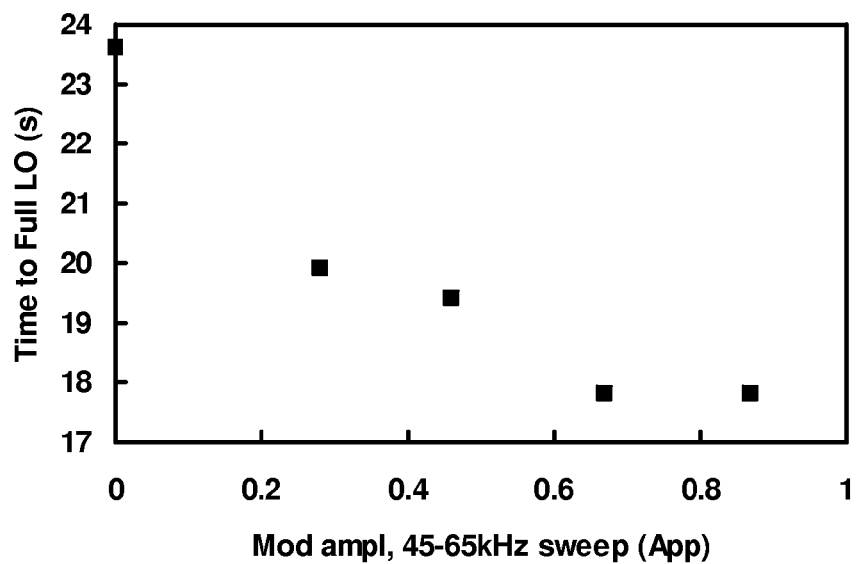
FIG. 2 is a plot of time to full light output (LO) versus modulation amplitude.

With reference to FIGS. 1 and 2, a particularly favorable result was achieved when the frequency of the swept sine wave ripple was 45-65 kHz. The reduction in run-up time to full light output was up to 20-25%. It was found that the reduction in run-up time was dependent on both the amplitude of the ripple and the center frequency of the sweep. For a 20 kHz excitation sweep, the optimum center frequency was 55 kHz, and the run-up time decreased from about 24 seconds to less than 18 seconds as the amplitude increased from zero (no modulation) to about 0.9 A. The modulation amplitude (amps peak-to-peak) describes the excursion of the current from an average of 1 A at a few seconds after ignition. As the run-up proceeded, it was found that modulation amplitude tended to decrease, probably due to lamp impedance changes that reduced the net coupling of the modulation ripple to the lamp.

As best understood, the above-described modulation excites the first azimuthal resonance mode of this arc tube. The arc tube itself is nearly spherical, but the thermal distribution of the arc imposes an axial symmetry, so that the symmetry of the cavity is between that of a sphere and a cylinder. Therefore, in the context of this invention, it is to be understood that as the symmetry of the cavity deviates from an ideal symmetry (e.g., spherical or cylindrical) that the acoustic resonance modes excited in the arc tube are identifiable by their resemblance to the modes that would result from an ideal symmetry. In this particular example, the modes should be understood to be azimuthal-like or radial-like.

Other acoustic modes were also found to give advantageous results. For example, a frequency of the swept sine wave of 165-195 kHz excited a combination of the first azimuthal and first radial resonance modes. The reduction in run-up time was about 10-15%.

While the experiments introduced the modulation as a ripple on the square wave input, the power modulation may also be introduced by other methods, such as operating the lamp directly on a sine wave that is swept from $f_1$ to $f_2$. In this event, there are power modulation frequencies at $2f_1$ to $2f_2$.

During the experiments, some arc instability in the form of arc rotation was observed, which would be seen by a user as flickering. The instability can be reduced by attending to the modulation amplitude. For example, the amplitude could be reduced during run-up, or selectively reduced during particular parts of the run-up, such as near the end of the run-up when the instability was most often observed.

The method of the present invention finds particularly advantageous application when used with the control method described in the above-cited copending application, especially with the "fourth alternative" described therein that is repeated below for ease of reference.

That is, the method of controlling run-up of a metal halide lamp that has a nominal light output $L_n$ during steady state operation and that has a current limit $I_{lim}$, includes the steps in which, during run-up of the metal halide lamp to steady state operation, lamp current I, voltage V, and power P are continuously sensed or calculated, and requested power $P_{req}$ and requested current $I_{req}$ for operating the lamp at the nominal light output $L_n$ during the run-up are continuously evaluated. The current limit $I_{lim}$ is supplied to the lamp so long as $I_{req}$ is greater than or equal to $I_{lim}$ and $P_{req}$ is supplied to the lamp when $I_{req}$ is less than $I_{lim}$. Supplying $P_{req}$ during the latter part of the run-up (when $I_{req}$ is less than $I_{lim}$) allows the lamp to be at or near nominal light output sooner than conventional metal halide lamps. During the run-up, power P supplied to the lamp is modulated at an acoustic resonance frequency of the lamp. The reference to "continuous" herein includes both analog signals and digital sampling.

The method includes a technique for determining when to switch from specifying lamp current to specifying lamp power, and how to adjust the power to maintain the nominal light output (this is the "fourth alternative" of the cited copending application.)

Figure 3:
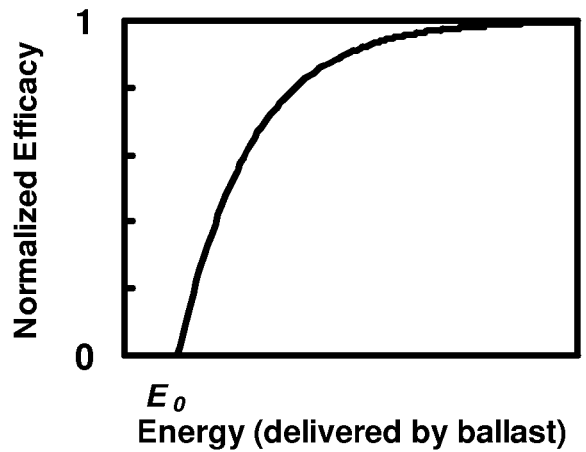
FIG. 3 is a graph of normalized lamp efficacy vs. energy delivered to the lamp.

The technique includes approximation of the normalized lamp efficacy as a function of energy delivered to the ballast. The normalized lamp efficacy is assumed to range from approximately zero to one at steady state operation. Applicants have observed that for a number of lamps the normalized efficacy (ignoring dependence on instantaneous power) versus ballast energy can be approximated as an exponential, characterized by a coefficient $E_1$ and perhaps with an offset $E_0$. This is shown in FIG. 3.

That is, the technique includes determining a function of normalized lamp efficacy η vs. energy E delivered to the lamp, and, during the run-up to steady state, determining E and estimating η from the function, wherein $P_{req}=P_n/\eta$, and $I_{req}=I*P_{req}/P$.

The function by which lamp efficacy η is estimated may be for $E \geq E_0$, $\eta=1-\exp(-(E-E_0)/E_1)$, and for $E < E_0$, $\eta=0$, where $E_0$ and $E_1$ are constants which describe η(E), and $P_n$ is a nominal power for the lamp during steady state operation. The function may be stored in a table in a memory in the ballast.

If $E_0$ and $E_1$ are specified, then the normalized lamp efficacy can be approximated at times during the run-up, and the requested power $P_{req}$ is the nominal power $P_n$ divided by the normalized lamp efficacy.

For example, if at some point during the run-up the normalized lamp efficacy is 0.5, then the lamp power should be twice the nominal level. Of course, at the beginning of the run-up the current limit may control so the lamp power may not be attainable.

One advantage of the technique is that for a given lamp design, a single set of parameters $E_0$ and $E_1$ can generally be found to give reasonable run-up results independent of the current limit. The better the approximation of normalized efficacy, the more "ideal" the light output versus time (less deviation from $L_n$). Errors in approximation at the beginning of the run-up are less significant because the requested power will likely be limited by the current limit.

While embodiments of the present invention have been described in the foregoing specification and drawings, it is to be understood that the present invention is defined by the following claims when read in light of the specification and drawings.

We claim:

1. A method of controlling run-up of a metal halide lamp that has a nominal light output $L_n$ during steady state operation and that has a current limit $I_{lim}$, the method comprising the steps of:
   during run-up of the metal halide lamp to steady state operation, evaluating requested power $P_{req}$ and requested current $I_{req}$ to operate the lamp at the nominal light output $L_n$ during the run-up;
   during the run-up, supplying $I_{lim}$ to operate the lamp so long as $I_{req} \geq I_{lim}$ and supplying $P_{req}$ to operate the lamp when $I_{req} < I_{lim}$; and
   during the run-up, modulating power P supplied to the lamp.

2. The method of claim 1, wherein the step of modulating power includes sweeping a sine wave ripple on top of an input voltage waveform, and wherein a frequency range of the sine wave ripple includes an acoustic resonance frequency of the lamp.

3. The method of claim 1, further comprising the step of, during the run-up, estimating lamp efficacy, and wherein $P_{req}$ is a function of lamp efficacy.

4. The method of claim 1, wherein the step of modulating the power includes power modulation at an acoustic resonance frequency of the lamp.

5. The method of claim 4, wherein the acoustic resonance frequency is a frequency of a first azimuthal resonance mode of the lamp.

6. The method of claim 1, further comprising the steps of determining a function of normalized lamp efficacy η vs. energy E delivered to the lamp, and, during the run-up, sensing lamp current I and determining E and estimating η from the function, and wherein $P_{req} = P_n/\eta$, and $I_{req} = I*P_{req}/P$ where $P_n$ is a nominal power for the lamp during steady state operation.

7. The method of claim 6, wherein the function is stored in a table in a memory in a ballast that operates the lamp.

8. The method of claim 6, wherein the function is for $E \geq E_0$, $\eta = 1 - \exp(-(E-E_0)/E_1)$, and for $E < E_0$, $\eta = 0$, where $E_0$ and $E_1$ are constants which describe η(E).

9. A method of controlling run-up of a metal halide lamp that has a nominal light output $L_n$ during steady state operation and that has a current limit $I_{lim}$, the method comprising the steps of:
   during run-up of the metal halide lamp to steady state operation, continuously sensing lamp current I and voltage V and calculating power P, and continuously evaluating requested power $P_{req}$ and requested current $I_{req}$ to operate the lamp at the nominal light output $L_n$ during the run-up;
   supplying $I_{lim}$ to operate the lamp so long as $I_{req} \geq I_{lim}$;
   supplying $P_{req}$ to operate the lamp when $I_{req} < I_{lim}$; and
   during the run-up, modulating power P supplied to the lamp at an acoustic resonance frequency of the lamp.

10. The method of claim 9, wherein the acoustic resonance frequency is a frequency of a first azimuthal resonance mode of the lamp.

11. The method of claim 9, further comprising the step of, during the run-up, estimating lamp efficacy, and wherein $P_{req}$ is a function of lamp efficacy.

12. The method of claim 9, further comprising the steps of determining a function of normalized lamp efficacy η vs. energy E delivered to the lamp, and, during the run-up, determining E and estimating η from the function, and wherein $P_{req} = P_n/\eta$, and $I_{req} = I*P_{req}/P$ where $P_n$ is a nominal power for the lamp during steady state operation.

13. The method of claim 12, wherein the function is stored in a table in a memory in ballast that operates the lamp.

14. The method of claim 12, wherein the function is for $E \geq E_0$, $\eta = 1 - \exp(-(E-E_0)/E_1)$, and for $E < E_0$, $\eta = 0$, where $E_0$ and $E_1$ are constants which describe η(E).

15. A ballast for a metal halide lamp that has a nominal light output $L_n$ during steady state operation and that has a current limit $I_{lim}$, said ballast embodying a program that causes the ballast to control run-up of the metal halide lamp to steady state operation, the program causing the ballast to perform the steps of:
   during run-up of the metal halide lamp to steady state operation, evaluating requested power $P_{req}$ and requested current $I_{req}$ to operate the lamp at the nominal light output $L_n$ during the run-up;
   during the run-up, supplying $I_{lim}$ to operate the lamp so long as $I_{req} \geq I_{lim}$ and supplying $P_{req}$ to operate the lamp when $I_{req} < I_{lim}$; and
   during the run-up, modulating power P supplied to the lamp.

16. The ballast of claim 15, wherein the step of modulating power includes sweeping a sine wave ripple on top of an input voltage waveform, and wherein a frequency range of the sine wave ripple includes an acoustic resonance frequency of the lamp.

17. The ballast of claim 15, wherein the step of modulating the power includes power modulation at an acoustic resonance frequency of the lamp.

18. The ballast of claim 17, wherein the acoustic resonance frequency is a frequency of a first azimuthal resonance mode of the lamp.

* * * * *